Dec. 11, 1951  W. L. WEEKS  2,578,493
MAP HOLDER
Filed Aug. 18, 1950
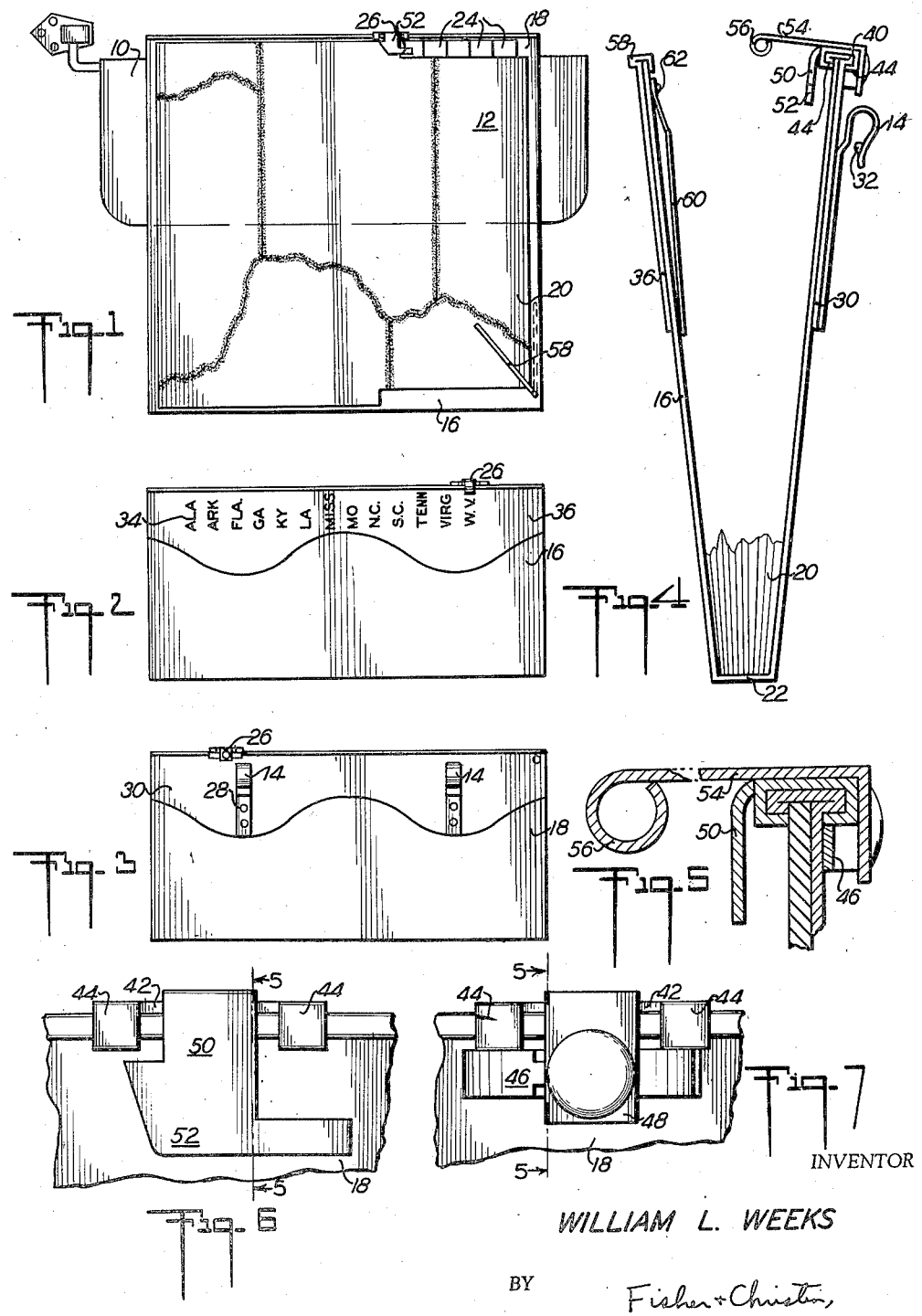
INVENTOR
WILLIAM L. WEEKS
BY Fisher + Christin,
ATTORNEYS Patented Dec. 11, 1951

2,578,493

UNITED STATES PATENT OFFICE 2,578,493

MAP HOLDER

William Leland Weeks, Shawsville, Va.

Application August 18, 1950, Serial No. 180,251

4 Claims. (Cl. 40—103)

The present invention relates to a device for holding a plurality of road maps and for selectively displaying individual maps in a position which is convenient for motor vehicle operators.

It is an object of the present invention to provide a device especially adapted for attachment to the sun visor of an automobile having means for selectively displaying road maps by a simple manual manipulation.

It is a more specific object of this invention to provide a map carrying device having maps printed on individual pages provided with progressive projections at one edge, a pair of hinged covers, means secured to one of said covers for attaching said device to the sun visor of an automobile, the edge of the same said cover being provided with a T-shaped slideway, the mating edge of the other said cover being provided with visible indicia indicating the individual maps within the covers, and a page selector cooperating with said slideway, said page selector being provided with an indicator for cooperation with said indicia, whereby a manual manipulation of said page selector will select a map for display.

These and other objects will be more apparent in the foregoing specification and drawings.

It is known in the art that maps may be mounted at a position convenient for the operator of a motor vehicle and it is not uncommon to paste maps or to otherwise secure maps to sun visors of an automobile so that they will be in a readily accessible position. Such devices have been generally unsatisfactory, however, because of the limited number of maps which can be displayed and because of the difficulty of changing the display. Accordingly, the present invention provides a device which holds a plurality of maps, any one of which may be displayed at the will of the operator by a simple motion no more difficult than required for displaying the single maps of the prior art devices.

Generally the present invention comprises a map holder for selectively displaying one of a plurality of individual maps at a convenient position on a sun visor before a motor vehicle operator, comprising a holdable booklet of pages printed with individual maps, a front cover and a back cover for said booklet, one edge of each of said covers being hinged together, one of said covers being provided at its opposite edge with a slideway parallel with said hinge, the other of said covers being provided with indicia identifying the individual maps within said booklet, a page selector movable on said slideway and cooperating with said indicia when the booklet is folded for selecting an individual map page to be displayed, means on said page selector for releasably latching said covers in closed position, and means on said cover carrying said slideway for holding said booklet on the sun visor of a motor vehicle.

The invention may also take the embodiment of a map holder for selectively displaying one of a plurality of individual maps at a convenient position on a sun visor before a motor vehicle operator, comprising a booklet of pages printed with individual maps, a front cover and a back cover for said booklet, a page selector cooperating with said covers for selecting a map page to be displayed, said page selector being provided with releasable means for holding said booklet closed and means secured to one of said covers for holding said booklet on said visor with its hinged edge adjacent and parallel to the bottom of said visor with the page selector adjacent to the top of said visor, and so adapted that release of the holding means will enable the booklet to open solely by the force of gravity and present two adjacent pages in the form of an open sheet.

The invention may further be characterized by a map holder for selectively displaying one of a plurality of individual maps on the sun visor of a motor vehicle, comprising a foldable booklet of pages printed with individual maps, a front cover and a back cover for said booklet, a page selector cooperating with one of said covers and with one of said pages for selecting a map page to be displayed, and means for securing said booklet on said sun visor to display said maps in a readily accessible position.

In the drawing:

Fig. 1 is a plan view of the map holder of the present invention in open display position attached to an automobile sun visor;

Fig. 2 is a front plan view of a map holder in closed position;

Fig. 3 is a back plan view of the map holder in closed position;

Fig. 4 is a side plan view of the map holder of the present invention in a partially open position with the individual map sheets partially cut away;

Fig. 5 is a cross-section of the page selector taken along 5—5 of the Figs. 6 and 7;

Fig. 6 is a front plan view of the page selector; and

Fig. 7 is a back plan view of the page selector.

In the embodiment of the invention as illustrated, a conventional automobile sun visor 10 is shown mounted at the upper left of an automobile windshield in front of the vehicle operator. In the position of Fig. 1, the visor in the "down" position is as it would be used for shielding the operator's eyes. A map holding booklet indicated generally at 12 is attached to the visor by resilient clamps 14, is shown in Figs. 3 and 4. The attachment is preferably so that the booklet 12 may be opened downwardly when the sun visor is in the "down" position.

Booklet 12 includes a front cover 16, a back cover 18, map pages 20 and a hinged back 22 which may be in the form of an ordinary book binder, as shown, or in the form of a spiral extending through both the covers and the map pages, or in any other conventional book, ledger or booklet structure. The pages of the booklet are provided at their outer edges with progressive projections 24 for engagement with a page selector or indicated generally at 26, which will be more fully described hereinafter.

The maps are preferably printed on the pages so that a single state map may be displayed on two adjacent pages, as shown in Fig. 1.

The booklet back cover 18 is provided with clamps 14 for attaching the booklet to the sun visor as mentioned above. In the present form of the invention, clamps 14 are attached to the cover 18 by means of rivets 28 extending through both the clamp and reinforcing member 30. In some forms of the invention, the reinforcing member may be omitted and any suitable means may be employed for securing the clamps to the back cover. A tooth 32 is provided on the inside of each clamp 14 for engagement with the sun visor in order to prevent the map holder from sliding off the visor when it is in the "up" position. Other suitable holding means may be employed for securing the map holder to the sun visor without departing from the scope of the invention. However, the clamps 14 are preferred because of their simplicity, effectiveness and ease of manufacture.

The front cover 16 is provided with indicia 34 for identifying the individual map pages within the map holder in cooperation with page selector 26. These printed indicia may be on a reinforcing member 36 as shown in the present invention, or they may be printed directly on the front cover.

The top edge of back cover 18 is provided with a T-shaped slideway 40 extending parallel to the hinge axis of the booklet. As shown in Fig. 4, the slideway is formed from an extension of reinforcing member 30.

The page selector indicated generally at 26 is adapted to be manually slid on slideway 40 for selecting a single map page to be displayed. The page selector includes a generally U-shaped member 42 having four bent fingers 44 at each corner thereof for securing the selector on the slideway.

A sliding spring member 46 is attached to or made integral with back leg 48 of U-shaped member 42 and serves the purpose of holding the page selector always in properly aligned relationship on slideway 40 by maintaining pressure against the back of cover 18, thus forcing and holding the selector 26 always in the rearmost position. It also serves to permit ease of movement of page selector and to prevent untimely movement thereof.

The forward leg 50 of the U-shaped member 42 terminates in a selector shoe 52 which engages individual projections 24 on the map pages 20 in accordance with the position thereof to cause the booklet to open and display the proper map page as predetermined by the manual positioning of the selector on the slideway.

A combination indicator and latch member 54 is attached to or made integral with the page selector for the dual purpose of indicating a map page to be selected and for manually holding the booklet covers in closed position. The indicator latch member is preferably made from spring steel in order to provide the proper resiliency. As shown, the latch member terminates in a curved C-shaped projection 56 which engages lip 58 of front cover 16 for securely closing booklet. An arrow or any other indicating means may be attached to the end of member 54 for more precise cooperation with indicia 34. Latch member 54 and spring member 46 may both be secured to page selector 26 by means of a rivet, as shown in Fig. 5 and Fig. 7, or any other suitable means.

Front cover 16 is further provided with a spring-like member 60 which is pivotally attached thereto by a member 62 and which serves the purpose of holding the map pages in an open position, as shown in Fig. 1. The device is manually operable and can be moved to an out of the way position as indicated by the broken lines in Fig. 1, except in instances where the wind tends to cause the map pages to flutter.

The nature of the T-shaped slide 40 is such that the forward part of the top thereof extends across the edges of the map pages when the booklet is in the closed position so that the page selector shoe rides forward of all the map sheets in a proper position for engaging the projections 24 when the booklet is open.

The operation of the device is one of utmost simplicity. Normally the device of the present invention is attached to the sun visor of an automobile in the "up" or "out of the way" position and the booklet is inverted, lying behind the visor. To display a map, the vehicle operator pulls the visor to the "down" position as if to utilize the shade. The page selector 26 is then manually slid until the indicator projection 56 is aligned with the name of a predetermined state on the indicia 34, as at West Virginia in Fig. 2. At this time the page selector shoe 52 is in a position to engage and hold a projection 24 at the top of the map page displaying the road map of the State of West Virginia. The spring indicator arm 46 is lifted from engagement with lip 58 and the booklet falls open to the proper page. Normally, the booklet will be in a readily accessible and easily viewable position with the pages lying generally flat against the covers. If the bottom pages do not lie flat against front cover 16 then spring holding member 60 may be manually pivoted from the dotted line position as shown in Fig. 1 to the operative position engaging the map pages. After viewing the map, the spring holder 60 is pivoted to the inoperative position and the book is closed. The spring latch member 54 automatically engages the lip 58 and holds the book closed and the sun visor may be then returned to an "out of the way" position.

Thus, it will be seen that the device of the present invention provides a simple, compact unit for selectively displaying individual maps of a plurality of maps in a position of convenience for a motor vehicle operator.

Obviously certain changes can be made in precise structure of the instant device without departing from either the spirit or the scope of the present invention.

I claim as my invention:

1. A map holder for selectively displaying one of a plurality of individual maps at a convenient position on a sun visor before a motor vehicle operator, comprising a foldable booklet of pages printed with individual maps, a front cover and a back cover for said booklet, one edge of each of said covers being hinged together, one of said covers being provided at its opposite edge with a slideway parallel with said hinge, the other of said covers being provided with indicia identifying the individual maps within said booklet, a page selector movable on said slideway and cooperating with said indicia when the booklet is folded for selecting an individual map page to be displayed, means on said page selector for releasably latching said covers in closed position, and means on said cover carrying said slideway for holding said booklet on the sun visor of a motor vehicle.

2. A map holder for selectively displaying one of a plurality of individual maps at a convenient position on a sun visor before a motor vehicle operator, comprising a foldable booklet of pages printed with individual maps, a front cover and a back cover for said booklet, one edge of each of said covers being hinged together, one of said covers being provided at its opposite edge with a slideway parallel with said hinge, the other of said covers being provided with indicia identifying the individual maps within said booklet, a page selector movable on said slideway and cooperating with said indicia when the booklet is folded for selecting an individual map page to be displayed, means on said page selector for releasably latching said covers in closed position, means on said cover carrying said slideway for holding said booklet on the sun visor of a motor vehicle, and means on said indicia bearing cover for holding the depending pages flat against the cover in nonfluttering convenient position when said booklet is open.

3. A map holder for selectively displaying one of a plurality of individual maps at a convenient position on a sun visor before a motor vehicle operator, comprising a booklet of pages printed with individual maps, a front cover and a back cover for said booklet, a page selector cooperating with said covers for selecting a map page to be displayed, said page selector being provided with releasable means for holding said booklet closed and means secured to one of said covers for holding said booklet on said visor with its hinged edge adjacent and parallel to the bottom of said visor with the page selector adjacent to the top of said visor, and so adapted that release of the holding means will enable the booklet to open solely by the force of gravity and present two adjacent pages in the form of an open sheet.

4. A map holder for selectively displaying one of a plurality of individual maps at a convenient position on a sun visor before a motor vehicle operator, comprising a booklet of pages printed with individual maps, a front cover and a back cover for said booklet, a page selector cooperating with at least one of said covers for selecting a map page to be displayed, releasable means for holding said booklet closed and means secured to one of said covers for holding said booklet on said visor with its hinged edge adjacent and parallel to the bottom of said visor with the page selector adjacent to the top of said visor, and so adapted that release of the holding means will enable the booklet to open solely by the force of gravity and present two adjacent pages in the form of an open sheet.

WILLIAM LELAND WEEKS.

REFERENCES CITED

The following references are of record in the file of this patent:

UNITED STATES PATENTS

| Number | Name | Date |
|---|---|---|
| 467,131 | Hall | Jan. 12, 1892 |
| 614,372 | De Ramus | Nov. 15, 1898 |
| 2,048,105 | Cobbs | July 21, 1936 |
| 2,539,286 | Thompson | Jan. 23, 1951 |